United States Patent
Greinert et al.

(10) Patent No.: US 10,353,265 B2
(45) Date of Patent: *Jul. 16, 2019

(54) ELECTROPHORETIC FLUIDS

(71) Applicant: Merck Patent GmbH, Darmstadt (DE)

(72) Inventors: Nils Greinert, Seeheim-Jugenheim (DE); Thomas Bauer, Darmstadt (DE); Matthias Koch, Wiesbaden (DE); Wolfgang Hechler, Lautertal (DE)

(73) Assignee: Merck Patent GmbH, Darmstadt (DE)

( * ) Notice: Subject to any disclaimer, the term of this patent is extended or adjusted under 35 U.S.C. 154(b) by 950 days.

This patent is subject to a terminal disclaimer.

(21) Appl. No.: 14/418,468

(22) PCT Filed: Jul. 22, 2013

(86) PCT No.: PCT/EP2013/002164
§ 371 (c)(1),
(2) Date: Jan. 30, 2015

(87) PCT Pub. No.: WO2014/019651
PCT Pub. Date: Feb. 6, 2014

(65) Prior Publication Data
US 2015/0219977 A1  Aug. 6, 2015

(30) Foreign Application Priority Data
Aug. 1, 2012 (EP) .................... 12005585

(51) Int. Cl.
G02F 1/167 (2019.01)
G09G 3/34 (2006.01)
C09B 35/20 (2006.01)
G02F 1/1333 (2006.01)
C09B 69/10 (2006.01)
G02F 1/1675 (2019.01)

(52) U.S. Cl.
CPC .............. *G02F 1/167* (2013.01); *C09B 35/20* (2013.01); *C09B 69/106* (2013.01); *G02F 1/133348* (2013.01); *G09G 3/344* (2013.01); *G02F 2001/1678* (2013.01)

(58) Field of Classification Search
USPC ................. 106/493; 359/237–247, 290–298; 252/500
See application file for complete search history.

(56) References Cited

U.S. PATENT DOCUMENTS

| | | | |
|---|---|---|---|
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 7,374,634 B2 | 5/2008 | Wang et al. | |
| 7,411,720 B2 | 8/2008 | Honeyman et al. | |
| 7,652,656 B2 | 1/2010 | Chopra et al. | |
| 8,698,734 B2 | 4/2014 | Sato | |
| 8,902,491 B2 * | 12/2014 | Wang ...................... | G02F 1/167 345/107 |
| 9,383,621 B2 | 7/2016 | Smith et al. | |
| 9,778,537 B2 * | 10/2017 | Wang ...................... | G02F 1/167 |
| 2005/0039274 A1 | 2/2005 | Yang et al. | |
| 2005/0168799 A1 * | 8/2005 | Whitesides ............ | B82Y 30/00 359/296 |
| 2011/0249043 A1 | 10/2011 | Sato | |
| 2012/0057218 A1 | 3/2012 | Setagawa | |
| 2015/0092262 A1 * | 4/2015 | Greinert ................ | C09C 1/3676 359/296 |
| 2015/0168797 A1 | 6/2015 | Greinert et al. | |
| 2015/0177587 A1 | 6/2015 | Smith | |

FOREIGN PATENT DOCUMENTS

| | | | |
|---|---|---|---|
| EP | 11006912.7 | | 8/2011 |
| EP | 11009486.9 | | 11/2011 |
| EP | 2407824 | * | 1/2012 |
| EP | 2407824 A1 | | 1/2012 |
| EP | 12002438.5 | | 4/2012 |
| GB | 2438436 A | | 11/2007 |
| JP | 2011237770 A | | 11/2011 |
| TW | 200540545 A | | 12/2005 |
| WO | WO-99/10767 A1 | | 3/1999 |
| WO | WO-2005017046 A2 | | 2/2005 |
| WO | WO-2009100803 A2 | | 8/2009 |
| WO | WO-2010089057 A2 | | 8/2010 |
| WO | WO-2010089058 A1 | | 8/2010 |
| WO | WO-2010089059 A1 | | 8/2010 |
| WO | WO-2010089060 A2 | | 8/2010 |
| WO | WO-2011154103 A1 | | 12/2011 |
| WO | WO-2011154104 A1 | | 12/2011 |
| WO | WO-2012019704 A1 | | 2/2012 |
| WO | WO-2012047000 A2 | | 4/2012 |
| WO | WO-2013026519 A1 | | 2/2013 |
| WO | WO-2013079146 A1 | | 6/2013 |
| WO | WO-2013149714 A1 | | 10/2013 |

OTHER PUBLICATIONS

International Search Report for PCT/EP2013/002164 dated Nov. 6, 2013.

* cited by examiner

*Primary Examiner* — Monique R Peets

(74) *Attorney, Agent, or Firm* — Drinker Biddle & Reath LLP

(57) ABSTRACT

This invention relates to electrophoretic fluids, the use of these fluids for the preparation of an electrophoretic display device, and electrophoretic displays comprising such fluids.

14 Claims, 2 Drawing Sheets

ELECTROPHORETIC FLUIDS

CROSS-REFERENCE TO RELATED APPLICATIONS

This application is a national stage application (under 35 U.S.C. § 371) of PCT/EP2013/002164, filed Jul. 22, 2013, which claims benefit of European Application No. 12005585.0, filed Aug. 1, 2012, both of which are incorporated herein by reference in their entirety.

This invention relates to electrophoretic fluids, the use of these fluids for the preparation of an electrophoretic display device, and electrophoretic displays comprising such fluids.

In recent years a need has developed for low power, low cost and light weight display devices. EPDs (Electrophoretic Displays) can fulfil this requirement. An EPD generally comprises charged electrophoretic particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white imagines, which are generated by using oppositely charged black and white particles. The use of different coloured particles in a single pixel has been exemplified in recent patent literature (U.S. Pat. No. 7,304,634, GB 2 438 436, US 2007/0268244). WO 2010/089057, WO 2010/089058, and WO 2010/089059 describe coloured polymer particles for EPD.

As mentioned above, Electrophoretic Display Fluids for black and white images are based on black and white particles which are carrying opposite charges. In order to obtain a white state with a high luminance, particles with a high refractive index are commonly used. The high refractive index of the particles and therewith associated high refractive index difference to the suspending fluid medium (commonly a low dielectric based fluid, i.e. hydrocarbons) result in a high scattering efficiency and thus high white state reflectivity. Particles usually used in electrophoretic fluids comprise charged inorganic nanoparticles such as titania, zirconium dioxide, or boron nitride coated with a surface layer to promote good dispersibility in dielectric media and a dielectric fluid media.

A significant problem using these particles is that the white state reflectivity of a pixel runs through a maximum when being switched and comes to rest at a less than optimum value. This decrease in luminance of the EPD fluid when fully switched to the white state is a significant problem. One possibility to prevent this would be to address the maximum luminance state by stopping the switching cycle at the ideal time. But this adds significantly to the complexity of the driving scheme of the display. At the same time, obtaining the maximum possible luminance is very important for a functioning display.

Therefore, the object of this invention is to provide new electrophoretic display materials with improved luminance.

This object is solved by an electrophoretic fluid according to claim 1 comprising at least one solvent, at least one set of coloured particles, at least one set of white reflective particles, and at least one set of transparent particles, wherein the white reflective particles and the transparent particles have the same electric charge sign and wherein the electrophoretic mobilities of the white reflective particles and the transparent particles differ at most by 50%. Preferably, the electrophoretic mobilities differ at most by 20%, especially at most by 10%. Particularly, the electrophoretic mobilities of the white reflective particles and the transparent particles differ at most by 5%. Electrophoretic mobilities are preferably measured using Malvern NanoZS Zetasizer equipment, or imaging microscopy. Preferably, particle mobilities are measured in the same solvent.

Furthermore, the object is solved by the use of such electrophoretic fluid for the preparation of a mono, bi or polychromal electrophoretic display device and by an electrophoretic display device comprising such an electrophoretic fluid.

Preferably, the electrophoretic fluids of the invention comprise at least one solvent, a set of black particles, a set of white reflective particles, and a set of transparent particles, wherein the white reflective particles and the transparent particles have electric charges and electrophoretic mobilities as described above.

When an electric field is applied, the white reflective particles and the transparent particles move with a similar velocity and compact while switching on the front electrode of an EPD cell.

Electrophoretic fluids of the invention show improved luminance and white state reflectivity (WSR %). Preferably, the WSR % is above 35%, 45%. WSR % and is measured by preparing an ink of 15% wt of white reflective particles, 0-15 wt % of transparent particles, 5% of colour particles, and two different charge control additives (0-5%).

The electrophoretic ink is tested in a standard LC test cell consisting of two parallel glass slides (50 µm separation) both having a 1×1 inch ITO coating. An electrical potential of +/−22V is applied for 2000 msec and the resulting Y value of the white state is measured (XRITE Color i5, integrating sphere in reflection mode, calibrated against a MgO standard, all data converted using d65 illumination standard). In addition, the white state reflectivity as a relative luminance is assessed. (Autronics DMS-301, hemisphere attachment, reflection mode, referenced against an MgO standard at 100% reflectivity).

The present invention avoids the problem of decrease of white state reflectivity of a pixel from a maximum to a less than optimum value when being switched. Usually, the decrease in luminance of the EPD fluid can only be avoided by stopping the switching cycle at the ideal time. However, this adds significant complexity to the driving scheme of the display.

On the contrary, electrophoretic fluids according to the invention provide optimum scattering without using a complex driving scheme of a display. So, the invention provides improved electrophoretic fluids showing a bright white state with maximum possible luminance.

An essential component of the electrophoretic fluids of the invention are particles having an index of refraction close to that of the dispersion medium of the EPD fluid throughout the specification and in the claims called "transparent particles". Suitable particles are $SiO_2$, barium sulfate, calcium carbonate, aluminium oxide, calcium silicate, magnesium fluoride, and polymer particles, i.e. polytetrafluoroethylene (PTFE) particles. Preferably, $SiO_2$ particles and PTFE particles are used. Preferably, $SiO_2$ particles, especially monodisperse $SiO_2$ particles are used. The transparent particles have preferably a size between 10 and 10000 nm, more preferred is 100 to 1000 nm, and most preferred is 150 to 500 nm.

Electrophoretic fluids of the invention comprise white and black particles which are oppositely charged or chargeable. Any such white and black particles commonly used in electrophoretic fluids may be used in the new electrophoretic fluids.

Usually electrophoretic fluids comprise white inorganic particles such as titania, alumina or barium sulphate, usually coated with a surface layer to promote good dispersibility in dielectric fluid media. The white particles can preferably be selected from titanium dioxide in the rutil, anatase, or amorphous modification, surface coated titanium dioxide, titanium dioxide based particles, and white polymer particles. The black particles can preferably be selected from carbon black, surface coated carbon black, carbon black based particles, and black polymer particles.

Preferably, titanium dioxide based pigments are used which could have the rutil, anatase, or amorphous modification, preferably rutil or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765.

Furthermore, the electrophoretic fluids of the present invention may comprise white reflective particles prepared by a process comprising the steps of a) forming a reverse emulsion comprising at least one polymer, at least one white reflective, at least one polar solvent, at least one non-polar solvent, and at least one surfactant and b) removing the polar solvent or polar solvents by evaporative methods. "Reverse emulsion" means that a non-polar solvent (preferably dodecane or comparable aliphatic hydrocarbons) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. Such white reflective particles are described in WO 2011/154104.

Examples for pigments suitable to achieve colour or black are: Carbon black, chromium (III) oxide green, cobalt blue spinel, iron (III) oxide red, iron (III) oxide orange, iron oxide hydroxide (FeOOH) yellow, iron oxide (Fe3O4) black, iron (II, III) oxide black. Organic pigments with structures based on Cu-phthalocyanine, quinacridone, monoazo, disazo, perylene, naphthalimide, quaterrylene or diketopyrrolopyrrole are also suitable for the present invention. Usually electrophoretic fluids comprise black inorganic particles such as carbon black, copper chromite, etc. usually coated with a surface layer to promote good dispersibility in dielectric media and a dielectric fluid media.

Also, black particles may be used which are prepared by a process comprising the steps of a) forming a reverse emulsion comprising at least one polymer, at least one white reflective or coloured particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. These black particles are described in WO 2013/026519.

Furthermore, the electrophoretic fluids of the present invention may comprise black polymer particles or any other absorbing polymer particles comprising a polymerised or co-polymerised dye. Especially black and/or coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles.

Such black polymer particles are described in WO 2013/079146 and comprise monomer units of at least one polymerisable dye according to Formula 1

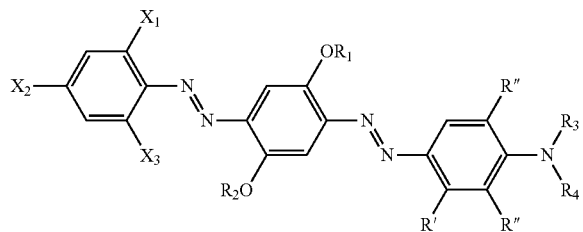

Formula (1)

Wherein $X_1$, $X_2$, and $X_3$ are independently of one another H or an electron-withdrawing group;

$R_1$ and $R_2$ are independently of one another groups of the structure $L_1$-$Y_1$, $L_2$-$Y_2$ or linear, branched or cyclic alkyl groups;

$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N;

$L_1$, $L_2$, $L_3$, and $L_4$ are independently of one another linear or branched, substituted or unsubstituted alkylene groups where one or more non-adjacent carbon atoms may be replaced by O, S and/or N;

$Y_1$, $Y_2$, $Y_3$, and $Y_4$ are independently of one another polymerisable groups;

R' is a linear or branched alkyl group, $OR_5$, H, $NHCOR_6$ or $NHSO_2R_7$;

R" is $OR_5$, H or $NHCOR_6$, $R_5$, $R_6$, and $R_7$ are independently of one another linear or branched alkyl groups; and Wherein at least one of $R_1$, $R_2$, $R_3$ and $R_4$ is a polymerisable group and at least one of $X_1$, $X_2$, and $X_3$ is an electron-withdrawing group. The term "electron-withdrawing group" is well known in the art and refers to the tendency of a substituent to attract valence electrons from neighbouring atoms; in other words the substituent is electronegative with respect to neighbouring atoms.

Coloured particle described in WO 2009/100803, WO 2010/089057, WO 2010/089058, WO 2010/089059, WO 2010/089060, WO 2011/154103 and/or WO 2012/019704 may also be used in electrophoretic fluids of the invention, preferably those described in WO 2010/089057 and/or WO 2012/019704.

In a variant of the invention, a combination of at least one set of colour particles and transparent particles having the same electric charge and the same electrophoretic mobility can be used. Such combinations lead to electrophoretic fluids showing improved colour impressions.

White, black, and coloured particles suitable for the invention are preferably spherical particles with a size (diameter) in the range of 50-1200 nm, preferably 50-1000 nm and preferably with a monodisperse size distribution, Preferred particle sizes are 150-950 nm. In a variant of the invention preferred particle sizes are 500-950 nm. Particle sizes are determined by photon correlation spectroscopy of hydrocarbon particle dispersions by a common apparatus such as a Malvern NanoZS particle analyser or preferably by SEM (Scanning Electron Microscopy) and image analysis.

An important aspect of the present invention is that the transparent and the white reflective particles have similar electrophoretic mobility. The electrophoretic mobilities of the white reflective particles and the transparent particles differ at most by 50%. Preferably, the electrophoretic mobilities differ at most by 20%, especially at most by 10%. Particularly, the electrophoretic mobilities of the white reflective particles and the transparent particles differ at most by 5% in order to move with the same velocity when being switched.

If the mobility of the white reflective particles and the transparent particles is not fully synchronised WSR performance is reduced. This disadvantage can be compensated by adding a higher amount of transparent particles. However, speed is hereby reduced.

In a most preferred variant of the invention particles having substantially equal electrophoretic mobilities are used.

Advantages can be:
A constant ratio of white reflective particles to transparent particles each and every time/switching state whether dispersed or compressed at the electrode;
Optimized dispersion/mixture of white reflective particles to transparent particles;
Adding only necessary amount of transparent particles for optimized reflectivity necessary.

Electrophoretic mobilities are preferably measured using Malvern NanoZS Zetasizer equipment, or imaging microscopy. The particles are preferably dispersed in dodecane with a suitable charge control agent (CCA).

The transparent and white reflective particles as well as black particles of the electrophoretic fluids are charged with typical additives for charging of the particles in EPD. Such additives are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (A-OT) (Aldrich).

In the particles of this invention, preferably Span 85 or AOT provide positive and negative charge to the particles respectively. Further charging agents for EPD particles are described below. The concentration of the CCA in electrophoretic fluids can range between 0.1-30% dependent on particle concentration.

Preferably, the transparent and the white reflective particles are modified with a charge selective dispersant (CSD) polymer stabiliser as described in the earlier patent application PCT/EP2013/000933. The CSD polymer provides the particles with a polymeric shell adsorbed onto the particles wherein the polymeric shell consists of a random copolymer having monomer or macromonomer building blocks, and the random copolymer comprises at least one hydrocarbon insoluble, charged or chargeable structural unit and at least one hydrocarbon soluble, stabilising structural unit. The polymer modifies the surface charge of the particles and acts as a dispersant.

The CSD polymers can preferably be prepared by free radical polymerization, polycondensation, and combination of polycondensation followed by free radical polymerization. A typical CSD is a co-polymer that consists of a hydrocarbon insoluble, charge control part and a hydrocarbon soluble, stabilising part. The two fractions are combined as a random copolymer.

The chemistry of the hydrocarbon insoluble, charge control part is optimised to create a desired charge when adsorbed onto an EPD particle. This part contributes between 1-99% percent by weight of the total CSD, especially preferred are 20-96%. The molecular weight of the total CSD is 5000-500,000. Especially preferred are 5,000-100,000.

The hydrocarbon soluble part of the CSD consists of a hydrocarbon soluble polymer or monomer. Typical are the polycondensates of fatty acids, functional poly-dimethyl siloxanes (PDMS), or long chain alkyl (meth)acrylates. Preferred are the polycondensate of the 12-hydroxystearic acid (PHSA), preferably with a molecular weight of 1000 to 10000, especially 2500 to 7500 and Gelest MCR-M22 (mono-methacrylate terminated Poly-dimethylsiloxanes; PDMS-MA) with a molecular weight of 10000.

The hydrocarbon insoluble part can be prepared from most monomer types, in particular methacrylates, acrylates, acrylamides, methacrylamides, acrylonitriles, alpha-substituted acrylates, styrenes and vinyl ethers, vinyl esters, and propenyl ethers, as long as the resulting polymer is insoluble in hydrocarbons.

The random copolymers of the invention usually comprise a hydrocarbon soluble part and a charge control part. Each of these contributes between 1-99% percent by weight to the total CSD. Especially preferred are 20-96% by weight. All weight percentages here and in the following are based on the weight of the total CSD.

When PHSA or PDMS macromonomers are used, the random copolymers preferably comprise 20-80% by weight of the hydrocarbon soluble part, especially 30-70% by weight. Advantageously, the random copolymers comprise 45-55%, especially 50%, by weight of the hydrocarbon soluble part. The remainder comprises the charge control part in each case.

When smaller hydrocarbon soluble monomers like long chain alkyl (meth)acrylates are used, the random copolymers preferably comprise 55-96% by weight of the hydrocarbon soluble part, especially 65-96% by weight. Advantageously, the random copolymers comprise 70-90% by weight of the hydrocarbon soluble part. The remainder comprises the charge control part in each case.

Preferred CSD polymers are random copolymers comprising mono-terminated polydimethylsiloxan methacrylate, (2,3-epoxypropyl)-methacrylat, and 2-tert-butylaminoethyl-methacrylate as well as graft copolymers comprising polystearate methacrylate, (2,3-epoxypropyl)-methacrylat, and 2-tert-butylaminoethylmethacrylate.

Also random copolymers comprising dodecylmethacrylate, and (2-(methylacryloyloxy)ethyltrimethyl ammonium methylsulfate are preferred.

By varying the monomers in the CSD, charge as well as electrophoretic mobility of the particles can be adopted and the mobility of transparent and the white reflective particles can be synchronised.

Preferably, the CSD provides a positive zeta potential to the transparent and the white reflective particles, whereby these particles get a charge opposite to that of the black particles and move to the electrode of opposite polarity.

The present electrophoretic fluids comprising white reflective particles and transparent particles having the same electric charge and electrophoretic mobility and showing to the observer improved luminance are primarily designed for use in electrophoretic display devices. So, further subjects of the invention are electrophoretic display devices comprising such fluids.

A typical electrophoretic display device which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

The role of the surfactant is to stabilize the dispersion and provide charge to the particles, allowing them to switch electrophoretically. This may be achieved by using a blend of surfactants or one single surfactant.

Surfactant examples are generally those with a hydrophilic head group and a hydrophobic tail.

Typical surfactants (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (A-OT) (Aldrich). Preferable surfactant additives in this work are OLOA, A-OT and derivatives, Span surfactants, and even more preferably A-OT and Span 85.

Any other additives to improve the electrophoretic properties can be incorporated provided they are soluble in the formulation medium, in particular thickening agents or polymer additives designed to minimise settling effects.

The dispersion solvent for the electrophoretic fluids of the invention can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane, and also dimethyltetralin. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol-OT (AOT), Infineum surfactants and/or Span 85, and dodecane (Sigma Aldrich).

Electrophoretic fluids of the invention preferably comprise a combination of the preferred components above described. Particularly, combinations of the especially preferred transparent particles, especially preferred white particles, especially preferred black particles, and especially preferred solvents are used for electrophoretic fluids of the invention.

In a preferred variant of the invention, the electrophoretic fluids of the invention comprise at least one solvent selected from long chain alkanes, the preferred transparent particles described, titania, and carbon black, wherein titania, and carbon black are preferably surface coated.

In another preferred variant of the invention, the electrophoretic fluids of the invention comprise at least one solvent selected from long chain alkanes, the preferred transparent particles described, white reflective polymer particles prepared by a RESR process described above, and black polymer particles prepared by a RESR process described above.

In an also preferred variant of the invention electrophoretic fluids comprise the preferred transparent particles, white reflective polymer particles prepared by a RESR process described above, and black polymer particles described above comprising a polymerised or co-polymerised dye.

Even more preferred electrophoretic fluids of the invention comprise dodecane, tetradecane, decane, nonane or mixtures thereof, the especially preferred transparent particles described, especially preferred white reflective particles, and especially preferred black particles.

Especially preferred electrophoretic fluids comprise dodecane, tetradecane, decane, nonane or mixtures thereof, the especially preferred transparent particles described, especially preferred white reflective particles, and especially preferred black particles, wherein the transparent particles and the white reflective particles are modified with a CSD.

Particularly, electrophoretic fluids of the invention may consist of the components described in the foregoing, preferably of all these components described as being preferred, especially of all these components described as being specially preferred.

The solvents and additives used to disperse the polymer particles of the invention are not limited to those used within the examples of this invention and many other solvents and/or dispersants can be used. Lists of suitable solvents and dispersants for electrophoretic displays can be found in existing literature, in particular in WO 99/10767 and WO 2005/017046. The electrophoretic fluid is then incorporated into an electrophoretic display element by a variety of pixel architectures, such as can be found in C. M. Lampert, Displays; 2004, 25(5) published by Elsevier B.V., Amsterdam.

The electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic fluids according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are expressly also part of the disclosure content of the present application. Plural forms of terms used herein are to be construed as including the singular form and vice versa if not indicated otherwise. Unless clearly indicated otherwise, all features of the invention may be used in any combination. Particularly, the preferred features of the invention may be used in any combination. Further variants of the invention and combinations of features, especially preferred features are disclosed in and/or derive from the claims and the examples. The following examples explain the present invention in greater detail without restricting the scope of protection. In the foregoing and in the following examples, unless otherwise indicated all parts and percentages are by weight.

EXAMPLES

The characterisation of the formulations is performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

All solvents are purchased from VWR at the highest grade possible and are used without further purification. Surfactants are purchased from Sigma Aldrich and are used without further purification.

The following abbreviations are used:
IMS industrial methylated spirit;
NMP N-Methylpyrrolidone
THF Tetrahydrofuran
DCM Dichloromethane
Mp melting point The luminance and contrast ratio is characterised by switching two particle inks (i.e. white/magenta) in a 1×1 inch macro pixel (parallel glass slides, 20 μm separation, 1×1 inch ITO array on each slide) and measuring the resulting white state reflectivity and contrast ratio (X-rite Color i5 with standard integrating sphere, calibrated against MgO standard). The electrophoretic inks are tested by applying electrical potential between 1 and 60V.

White particles are synthesised as exemplified in the earlier patent application PCT/EP2013/000933. Black particles are synthesised as exemplified in WO 2013/079146.

Example 1

Polystearate methacrylate (PSMA)

967.5 g of 12-hydroxystearic acid (TCl, H0308) are melted at 115° C. for 2 hours in a pre-weighed 2 liter 3-neck round bottom flask fitted with a thermometer, stopper, vacuum adaptor, magnet stirrer, and heating mantle. 2.23 g Methane sulphonic acid (Aldrich) is added and the temperature adjusted to 105° C. Vacuum (65 mBar at the beginning and 20 mbar at the end of the reaction) is applied to extract water. The progress of the reaction is monitored in the $^1$H NMR spectrum by following the decrease of the signal strength at 3.6 ppm compared to the 0.9 ppm resonance. The reaction is stopped once 99% conversion is reached.

To 384.0 g of the resulting product, 384.0 g of xylene (Merck, 108685), 0.36 g of N,N-dimethyldodecylamine (Aldrich, 384386), 0.45 g of 4-tert-butylpyrocatechol (Merck, 801987) and 48.5 g of glycidylmethacrylate (Merck, 800609) are added. The reaction is continued at 140° C. under a nitrogen atmosphere. The progress of the reaction is monitored by determining the acid value by titration. The reaction is complete once an acid value of 0.0003 is reached. Titration is performed using a 0.05M KOH in ethanol solution. Samples of approx. 0.5 g are removed from the reaction, diluted with toluene and titrated against phenolphthalein. The reaction product is diluted with xylene to obtain a polymer solution with a concentration of 50.0%.

Example 2

Charge Selective Dispersant 180 g of n-butyl acetate (Merck, 101974) are pre-heated to 85° C. (temperature at the heating block) in a 500 ml 3-neck flask equipped with reflux condenser, nitrogen supply, and septum. 38.4 g of polystearate methacrylate (Example 1; 52.2% solid dissolved in xylene), 2.0 g of (2,3-epoxypropyl)-methacrylate (Merck, 800609), 18.0 g of 2-tert-butylaminoethyl-methacrylate (Aldrich, 444332), and 0.48 g Vazo 67 (DuPont) are combined and added over a period of 3 hours using a dropping funnel. After addition of the reactants, an additional 0.48 g of Vazo 67 is added and the reaction is allowed to continue for 2 h. A polymer solution with a solid content of 15.2% is obtained.

Example 3

Modified $TiO_2$ Pigment 13.2 g of the resulting polymer solution of Example 2, 10.0 g of $TiO_2$ particles (DuPont, Ti-Pure R960), and 100.0 g dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 200 mL round bottom flask, 0.2 g diethanolamine (Merck, 116205) is added, and the mixture is reacted at 120° C. for 5 hours. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice. The resulting dispersion has a solid content of 36.1%.

Example 4

Modified Monosphere particles 10 g of freeze-dried, monodisperse $SiO_2$ particles (Merck, Monosphere 250) with a diameter of 250 nm are combined with 6.6 g of the polymer solution of Example 2, and 50 ml of dodecane. The mixture is subjected to ultrasound for 3 min (Branson Sonifier B15, Standard horn and microtip) at 150 W. 0.1 g diethanolamine is added and the dispersion heated for 5 h at 120° C. A nearly transparent, blue translucent dispersion is obtained.

Example 5

Preparation of a black polymerisable dye

Prepared by a 7 step procedure according to Example 3 of WO 2013/079146 as detailed below:

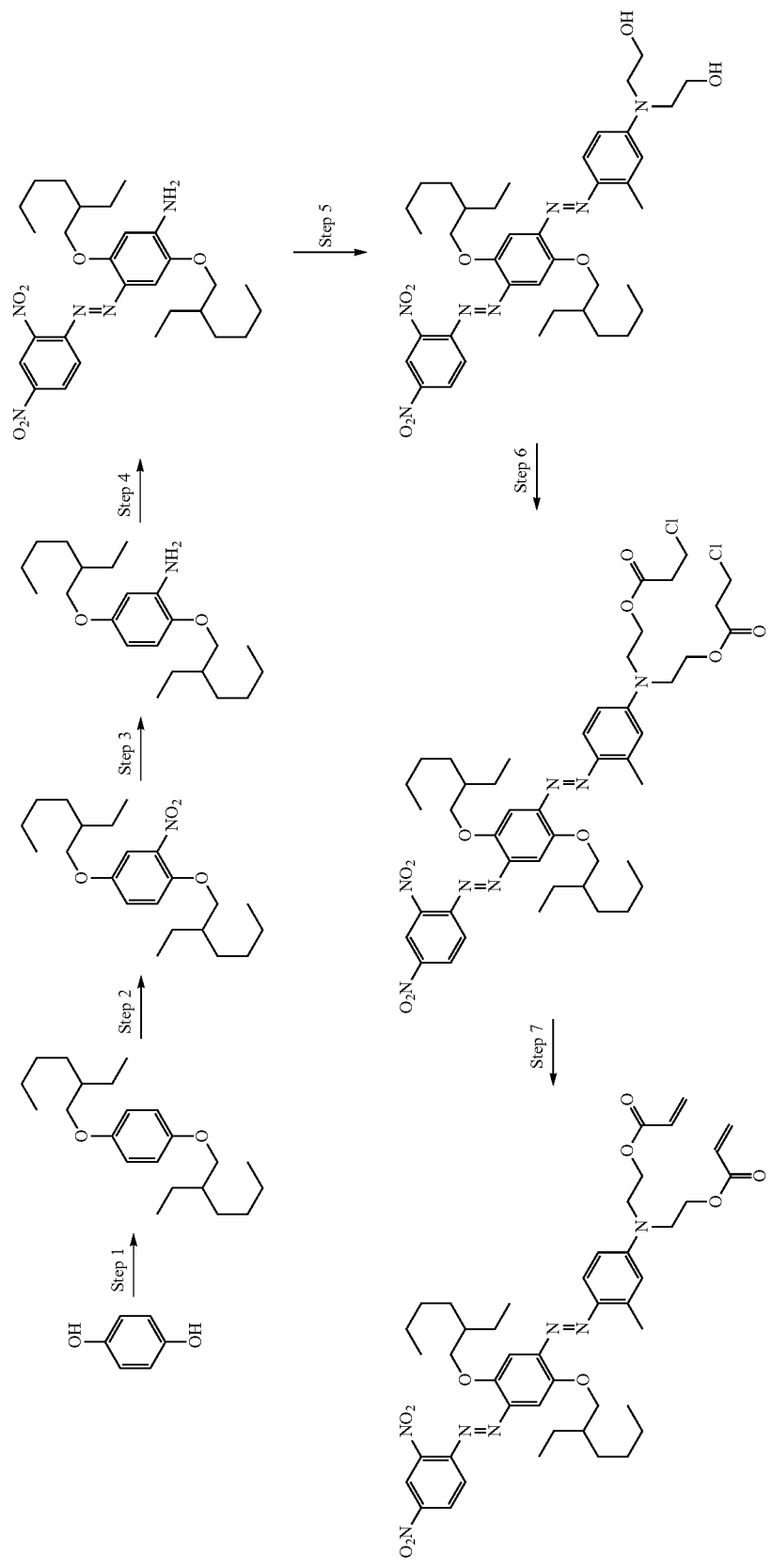

Step 1: 1,4-Bis(2-ethylhexyloxy)benzene

Hydroquinone (37.9 g, 0.344 mol) is suspended in IMS (310 ml) and 1-bromo-2-ethylhexane (132.7 g, 0.687 mol) is added. A solution of KOH (49.9 g, 0.89 mol) in IMS (250 ml) is added slowly over 1 minute. The mixture is heated at reflux whilst monitoring reaction progress by HPLC. After 16 hours, further 1-bromo-2-ethylhexane (53.1 g, 0.27 mol) and solid KOH (20.0 g, 0.36 mol) are added then heated for 2 hours at reflux. The reaction mixture is allowed to cool, is poured into water (1.5 L) and extracted with toluene (500 ml). The organic layer is dried over $MgSO_4$ then evaporated to yield a pale yellow oil. The oil is flashed through silica gel, eluting with 50/50 dichloromethane/hexane to give two product fractions. The initial fraction (35.3 g) co-eluted with 2-ethylhexan-1-ol by-product. The second fraction is evaporated to give pure 1,4-bis(2-ethylhexyloxy)benzene as a pale yellow oil (48.4 g, 42%). The initial fraction is further purified by bulb to bulb distillation to give further pure 1,4-bis(2-ethylhexyloxy)benzene as a pale yellow oil (25.3 g, 22%).

Step 2: 1,4-Bis(2-ethylhexyloxy)-2-nitrobenzene 1,4-Bis(2-ethylhexyloxy)benzene (50.2 g, 0.150 mol) is dissolved in chloroform (150 ml) and cooled to 0° C. Nitric acid (70%, 17.0 g, 0.190 mol) is added dropwise at 0-3° C. and the reaction stirred whilst monitoring progress by HPLC. After 60 minutes, water (50 ml) is added and the organic layer separated, dried ($MgSO_4$) and evaporated to give the title compound as a yellow oil (56.9 g, 100%). The material is used without further purification.

Step 3: 2,5-Bis(2-ethylhexyloxy)aniline 1,4-Bis(2-ethylhexyloxy)-2-nitrobenzene (11.4 g, 0.03 mol) is dissolved in 2-propanol (100 ml) and degassed under vacuum, purging to nitrogen. 10% (w/w) Pd/C (0.52 g) is added and the mixture heated to 80° C. Water (10 ml) is added, followed by solid ammonium formate (18.9 g, 0.3 mol). After a further 1 hour at 80° C., the reaction mixture is allowed to cool then filtered to remove catalyst, to give a colourless solution which darkened rapidly on standing. The material is used immediately as an isopropanol solution (quant.).

Step 4: 4-((2,4-Dinitrophenyl)diazenyl)-2,5-bis(2-ethylhexyloxy)aniline 2,4-Dinitroaniline (3.7 g, 0.02 mol) is suspended in a mixture of acetic acid (20 ml) and propionic acid (10 ml) and cooled to 3° C. 40% (w/w) nitrosyl sulfuric acid in sulfuric acid (6.4 g, 0.02 mol) is added dropwise and stirring continued for 30 minutes to give a pale yellow solution. Crude 2,5-bis(2-ethylhexyloxy)aniline (0.02 mol) solution is diluted with IMS (200 ml) and 10% sulfamic acid solution (20 ml) added, followed by ice (200 g). The above pale yellow diazonium salt solution is slowly added with stirring and a dark oil rapidly separated. The mixture is stirred overnight and the water is decanted off. The crude product (8.3 g) is dissolved in 25/75 dichloromethane/hexane and purified over silica gel, the required product eluting with 50/50 hexane/dichloromethane. Evaporation and trituration with methanol gave 4-((2,4-dinitrophenyl)diazenyl)-2,5-bis(2-ethylhexyloxy)aniline as a violet-blue crystalline solid (4.2 g, 39%).

Step 5: 2,2'-(4-((E)-(4-((E)-(2,4-Dinitrophenyl)diazenyl)-2,5-bis(2-ethylhexyloxy)phenyl)diazenyl)-3-methylphenylazanediyl)diethanol 4-((2,4-Dinitrophenyl)diazenyl)-2,5-bis(2-ethylhexyloxy)aniline (0.54 g, 1 mmol) is dissolved in NMP (10 ml) and to this is added 40% (w/w) nitrosyl sulfuric acid in sulfuric acid (0.38 g, 1.2 mmol). After 30 minutes, the mixture is added to a solution of 2,2'-(m-tolylazanediyl)diethanol (0.20 g, 1 mmol) and sulfamic acid (0.5 g) in IMS (100 ml). A dark oily solid separates immediately. After stirring overnight, the aqueous supernatant is decanted off, the oily solid washed with further water, then dried at 40° C. The pure title compound is acquired as a blue-black solid after multiple purifications over silica gel, eluting with dichloromethane containing an increasing concentration of ethyl acetate (0.54 g, 72%).

Step 6: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate)

2,2'-(4((E)-(4-((E)-(2,4-Dinitrophenyl)diazenyl)-2,5-bis(2-ethylhexyloxy)phenyl)diazenyl)-3-methylphenylazanediyl)diethanol (3.5 g, 5 mmol) is dissolved in dichloromethane (50 ml) and sodium bicarbonate (12.6 g, 0.15 mol) is added with stirring to suspend. 3-chloropropionyl chloride (1.9 g, 15 mmol) is added and the mixture heated at 40° C. (bath temp.) overnight. The inorganics are filtered off, the dichloromethane is evaporated and the product solidified by adding IMS. A 2.7 g sample of crude product is taken through directly to the next step without further purification. A 1 g sample of material is recrystallised from IMS to obtain a pure sample as a violet/black crystalline solid; m.p 123-125° C., $\lambda_{max}$ (EtOAc) 573 nm (40,000), half bandwidth 160 nm, 353 nm (13,500).

Step 7: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)diacrylate Crude 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate) (2.7 g, 2.9 mmol) is dissolved in dichloromethane (50 ml) and triethylamine (0.9 g, 8.7 mmol) is added. The mixture is heated at 30° C. (bath temp.) overnight and the product precipitated by adding IMS. The solid is recrystallised from hot IMS and the title compound is isolated as a violet/black powder; m.p 128-130° C., $\lambda_{max}$ (EtOAc) 574 nm (40,000), half bandwidth 160 nm, 354 nm (13,500).

Example 6

Preparation of Black Polymer Particles

Black polymer particles are prepared analogously to Example 6 of WO 2013/079146:

NAD stabiliser 30% by weight in dodecane is obtained from ICI Ltd. precipitated in cold methanol, dried and dissolved in a 50:50 mixture of ethyl acetate (Aldrich) and butyl acetate (Aldrich). All materials other than dyes are commercially available.

Methyl methacrylate (20.58 g), NAD stabiliser (3.50 g) and methacrylic acid (0.42 ml) are weighed out into a 100 ml 3-necked flask equipped with a condenser, nitrogen flow, and an overhead stirrer. 1.029 g (5 weight %) of the black polymerisable dye of Example 2 is added and stirred for 1 minute to facilitate dissolution of the dye. Dodecane (25.20 g) is added to the reaction flask, followed by 1-octanethiol (0.125 ml). The mixture is heated with stirring at 300 rpm, once the temperature in the flask is at 75° C., Vazo 67 (0.20 g) is added and the reaction is stirred for 2 hours.

The resulting solution is filtered through 50 micron cloth to remove small lumps. The particles are cleaned using a centrifuge. Centrifugations are carried out at 10 000 rpm for 40 minutes each, replacing the supernatant with dodecane, this is repeated until the supernatant is colourless. Average particle size is measured by SEM and image analysis: 547 nm.

Example 7

EPD Ink and WSR %

Electrophoretic inks with two oppositely charged particles are prepared by vortex mixing of the components and then roller mixing of the dispersion resulting in a formulation of 15.0% wt of $TiO_2$ particles of Example 3, 5.0 wt % of black particles of Example 6, 2.5% Aerosol OT, 2.0 wt % alkyl aryl sulfonate and varying amounts of the modified monosphere particles of Example 4 in dodecane. (0-15% wt).

The electrophoretic ink is tested in a standard LC test cell consisting of two parallel glass slides (50 μm separation) both having a 1×1 inch ITO coating. An electrical potential of +/−22V is applied for 2000 msec and the resulting Y value of the white state is measured (XRITE Color i5, integrating sphere in reflection mode, calibrated against a MgO standard, all data converted using d65 illumination standard). In addition, the white state reflectivity as a relative luminance is assessed. (Autronics DMS-301, hemisphere attachment, reflection mode, referenced against an MgO standard at 100% Reflectivity)

The measured Y value and WSR % in relation to the added Monosphere content is shown in FIG. 1. As can be seen, the addition of transparent particles significantly increases the obtained WSR.

Example 8

Charge Selective Dispersant 350 g of n-butyl acetate (Merck, 101974) are pre-heated to 85° C. (temperature at the heating block) in a 500 ml 3-neck flask equipped with reflux condenser, nitrogen supply, and septum. 96.0 g of Polystearate methacrylate (Example 1; 52.2% solid dissolved in Xylene,), 5.0 g of (2,3-Epoxypropyl)-methacrylate (Merck, 800609), 45.0 g of 2-tert-Butylaminoethyl-methacrylate (Aldrich, 444332), and 1.2 g Vazo 67 (DuPont) are combined and added over a period of 3 hours using a dripping funnel. After addition of the reactants, an additional 0.6 g of Vazo 67 is added and the reaction is allowed to continue for 2 h. A polymer solution with a solid content of 14.86% is obtained.

Example 9

Modified TiO2 Pigment 3.55 g of the resulting polymer solution of Example 8, 10.0 g of TiO2 particles (Dupont, Ti-Pure R960), and 50.0 g Dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 100 mL round bottom flask, and the mixture is heated to 120° C. for 4 hours. Afterwards, the particles are deposited (benchtop centrifuge, RCF=3000, 20 min) and redispersed in fresh dodecane thrice and filtered through a 50 micron cloth (SEFAR NITEX 03-50/1). The resulting dispersion has a solid content of 37.2%.

Example 10

Modified PTFE Particles 10 g of PTFE particles (Aldrich, 430935) with a diameter of 1000 nm are combined with 3.55 g of the resulting polymer solution of Example 8, and 40 ml Dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 100 mL round bottom flask, and the mixture is heated to 120° C. for 4 hours. Remaining coagulates are allowed to sediment and separated from the dispersion. Afterwards, the particles are deposited (benchtop centrifuge, RCF=3000, 20 min) and redispersed in fresh dodecane thrice and filtered through a 50 micron cloth (SEFAR NITEX 03-50/1). The resulting dispersion has a solid content of 41.2%.

Example 11

EPD Ink and WSR %

Electrophoretic inks with two oppositely charged particles are prepared in dodecane. Details are given in Table 1.

TABLE 1

|  | Reference Dispersion | PTFE Dispersion |
| --- | --- | --- |
| TiO2 particle (wt %) | 15.0 | 15 |
| PTFE particle (wt %) |  | 10 |
| Aerosol OT (wt %) | 2.5 | 2.5 |
| Aryl alkyl sulfonate (wt %) | 2.0 | 2.0 |

The electrophoretic ink is tested in a standard LC test cell consisting of two parallel glass slides (50 μm separation) both having a 1×1 inch ITO coating. An electrical potential of +/−22V is applied for 2000 msec and the resulting Y value of the white state is measured (XRITE Color i5, integrating sphere in reflection mode, calibrated against a MgO standard, all data converted using d65 illumination standard).

The measured Y value for the white state and contrast ratio obtained from the ration of Y values at white versus black state is shown in relation to the added PTFE content in FIG. 2. As can be seen, the addition of transparent particles significantly increases the Y value and contrast ratio.

FIGURES

Figure 1:
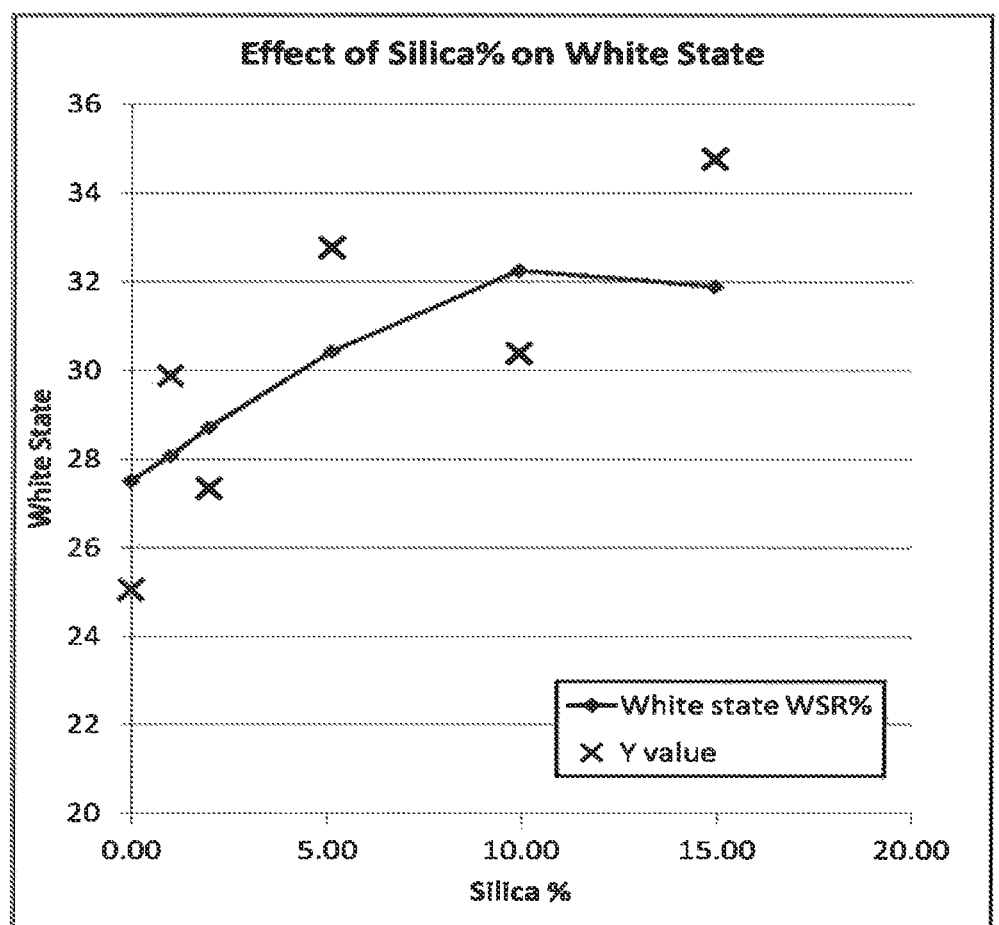
FIG. 1 shows the Y value and WSR % of the EPD ink of Example 7
Figure 2:
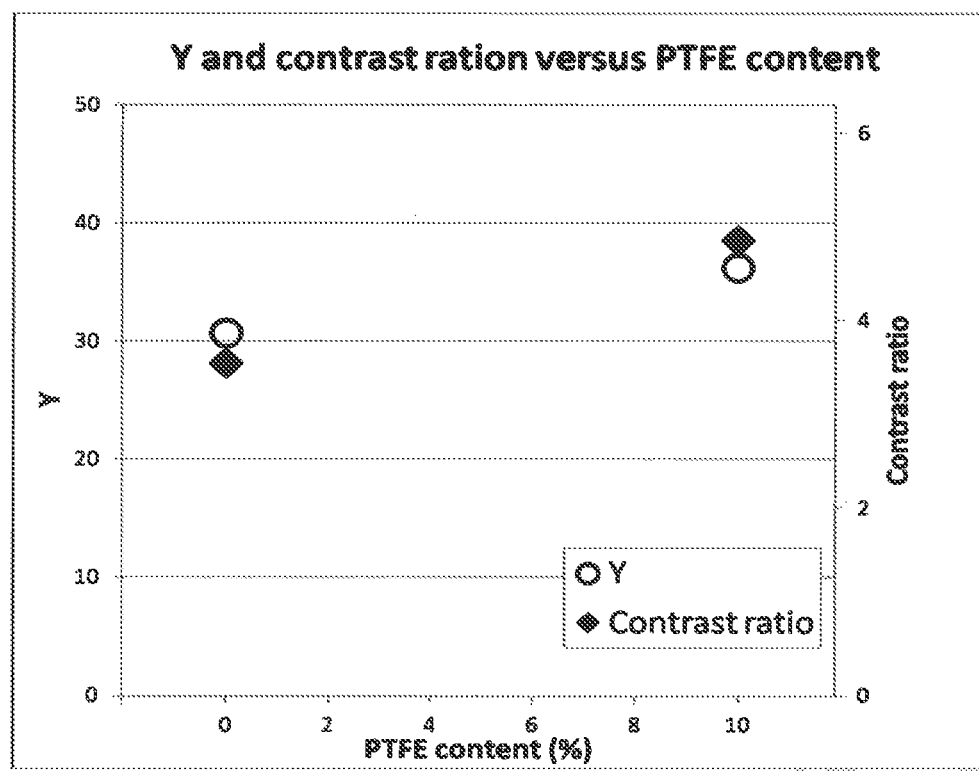
FIG. 2 shows the Y value and contrast ratio of the EPD ink of Example 11

The invention claimed is:

1. An electrophoretic fluid comprising at least one solvent, at least one set of coloured particles, at least one set of white reflective particles, and at least one set of transparent particles, wherein the white reflective particles and the transparent particles have the same electric charge sign wherein the white reflective particles, and the transparent particles comprise a polymeric shell adsorbed onto the particle wherein the polymeric shell consists of a random copolymer selected from random copolymers comprising mono-terminated polydimethylsiloxan methacrylate, (2,3-epoxypropyl)-methacrylat, and 2-tert-butylaminoethylmethacrylate or graft copolymers comprising polystearate methacrylate, (2,3-epoxypropyl)-methacrylat, and 2-tert-butylaminoethylmethacrylate or random copolymers comprising dodecylmethacrylate, and (2-(methylacryloyloxy) ethyltrimethyl ammonium methylsulfate and wherein the electrophoretic mobilities of the white reflective particles and the transparent particles differ at most by 5%.

2. The electrophoretic fluid according to claim 1, wherein the electrophoretic fluid comprises a set of black particles, a set of white reflective particles, and a set of transparent particles.

3. The electrophoretic fluid according to claim 1, wherein the electrophoretic fluid comprises silica particles or polytetrafluoroethylene particles as transparent particles.

4. The electrophoretic fluid according to claim 1, wherein the electrophoretic fluid comprises white particles selected from titanium dioxide in the rutil, anatase, or amorphous modification, surface coated titanium dioxide, titanium dioxide based particles, and white polymer particles as white reflective particles.

5. The electrophoretic fluid according to claim 1, wherein the electrophoretic fluid comprises titanium dioxide in the rutil, anatase, or amorphous modification as white reflective particles.

6. The electrophoretic fluid according to claim 1, wherein the electrophoretic fluid comprises black particles selected from carbon black, surface coated carbon black, carbon black based particles, and black polymer particles.

7. The electrophoretic fluid according to claim 1, wherein the coloured particles, the black particles, the white reflective particles, and/or the transparent particles comprise a polymeric shell adsorbed onto the particle wherein the polymeric shell consists of a random copolymer having monomer or macromonomer building blocks, and the random copolymer comprises at least one hydrocarbon insoluble, charged or chargeable structural unit and at least one hydrocarbon soluble, stabilising structural unit.

8. The electrophoretic fluid according to claim 1, wherein the electrophoretic fluid comprises at least one non-polar solvent having a dielectric constant<10, volume resistivity about $10^{15}$ ohm-cm, viscosity<5 cst, and a boiling point>80° C.

9. The electrophoretic fluid according to claim 1, wherein the electrophoretic fluid comprises at least one surfactant.

10. A method for the preparation of a mono, bi or polychromal electrophoretic device comprising utilizing the electrophoretic fluids according to claim 1.

11. A method comprising displaying an image with an electrophoretic fluid according to claim 1.

12. An electrophoretic display device comprising an electrophoretic fluid according to claim 1.

13. The electrophoretic display device according to claim 12, wherein the electrophoretic fluid is applied by a technique selected from inkjet printing, slot die spraying, nozzle spraying, and flexographic printing, or any other contact or contactless printing or deposition technique.

14. An electrophoretic fluid comprising at least one solvent, at least one set of coloured particles, at least one set of white reflective particles, and at least one set of transparent particles, wherein the white reflective particles and the transparent particles have the same electric charge sign, wherein the white reflective particles, and the transparent particles comprise a polymeric shell adsorbed onto the particle wherein the polymeric shell consists of a random copolymer selected from random copolymers comprising mono-terminated polydimethylsiloxan methacrylate, (2,3-epoxypropyl)-methacrylat, and 2-tert-butylaminoethylmethacrylate or graft copolymers comprising polystearate methacrylate, (2,3-epoxypropyl)-methacrylat, and 2-tert-butylaminoethylmetscrylate and wherein the electrophoretic mobilities of the white reflective particles and the transparent particles differ at most by 5%.

* * * * *